United States Patent
Decker et al.

(10) Patent No.: US 9,574,094 B2
(45) Date of Patent: Feb. 21, 2017

(54) GRAPHENIC CARBON PARTICLE DISPERSIONS AND METHODS OF MAKING SAME

(71) Applicant: PPG Industries Ohio, Inc., Cleveland, OH (US)

(72) Inventors: Eldon L Decker, Gibsonia, PA (US); Stephen Brian Istivan, Pittsburgh, PA (US); Xiangling Xu, Pittsburgh, PA (US); Brian E. Woodworth, Pittsburgh, PA (US); W. David Polk, Pittsburgh, PA (US); Noel R. Vanier, Wexford, PA (US); Cheng-Hung Hung, Wexford, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 14/100,064

(22) Filed: Dec. 9, 2013

(65) Prior Publication Data

US 2015/0159030 A1 Jun. 11, 2015

(51) Int. Cl.
*C09D 7/02* (2006.01)
*C09D 5/24* (2006.01)
(Continued)

(52) U.S. Cl.
CPC . *C09D 7/02* (2013.01); *C09D 5/24* (2013.01); *H01B 1/24* (2013.01); *C08K 3/04* (2013.01); *C08K 2201/011* (2013.01)

(58) Field of Classification Search
CPC .................................................. C01B 31/04
(Continued)

(56) References Cited

U.S. PATENT DOCUMENTS

| | | |
|---|---|---|
| 5,114,477 A | 5/1992 | Mort et al. |
| 5,527,518 A | 6/1996 | Lynum et al. |
| 5,763,548 A | 6/1998 | Matyjaszewski et al. |
| 5,789,487 A | 8/1998 | Matyjaszewski et al. |
| 5,807,937 A | 9/1998 | Matyjaszewski et al. |
| 6,099,696 A | 8/2000 | Schwob et al. |
| 6,316,119 B1 | 11/2001 | Metzger et al. |
| 6,358,375 B1 | 3/2002 | Schwob |

(Continued)

FOREIGN PATENT DOCUMENTS

| | | |
|---|---|---|
| CN | 102877109 A | 1/2013 |
| KR | 20130013689 A | 2/2013 |

(Continued)

OTHER PUBLICATIONS

Bergeron, Emmanuel "Production of Carbon by Pyrolysis of Methane in Thermal Plasma", Master's Thesis in Applied Sciences, University of Sherbrooke, Faculty of Applied Sciences, Department of Chemical Engineering, Quebec, Canada, Oct. 1997.
Chen, Shanshan et al. "Oxidation Resistance of Graphene-Coated Cu and Cu/Ni Alloy", ACS Nano, Jan. 28, 2011, pp. 1321-1327.
Choi, Ki Seok et al. "Fabrication of Free-Standing Multilayered Graphene and Poly(3,4-ethylenedioxythiophene) Composite Films with Enhanced Conductive and Mechanical Properties", Langmuir, 26 (15), 2010, pp. 12902-12908.

(Continued)

*Primary Examiner* — Daniel C McCracken
(74) *Attorney, Agent, or Firm* — Alan G. Towner

(57) ABSTRACT

Dispersions of graphenic carbon particles are produced using a polymeric dispersant. The polymeric dispersant includes an anchor block comprising glycidyl (meth)acrylate, 3,4-epoxycyclohexylmethyl(meth)acrylate, 2-(3,4-epoxycyclohexyl)ethyl(meth)acrylate, allyl glycidyl ether and mixtures thereof, reacted with a carboxylic acid comprising 3-hydroxy-2-naphthoic acid, para-nitrobenzoic acid, hexanoic acid, 2-ethyl hexanoic acid, decanoic acid and/or undecanoic acid. The polymeric dispersant also includes at least one tail block comprising at least one (meth)acrylic acid alkyl ester.

17 Claims, 2 Drawing Sheets

(51) Int. Cl.
*H01B 1/24* (2006.01)
*C08K 3/04* (2006.01)

(58) Field of Classification Search
USPC .......................................... 252/511; 423/448
See application file for complete search history.

(56) References Cited

U.S. PATENT DOCUMENTS

| | | | |
|---|---|---|---|
| 6,441,066 | B1 | 8/2002 | Woodworth et al. |
| 7,071,258 | B1 | 7/2006 | Jang et al. |
| 7,754,184 | B2 | 7/2010 | Mercuri |
| 7,785,492 | B1 | 8/2010 | Jang et al. |
| 7,790,285 | B2 | 9/2010 | Zhamu et al. |
| 7,824,741 | B2 | 11/2010 | Sandhu |
| 7,842,271 | B2 | 11/2010 | Petrik |
| 8,047,248 | B2 | 11/2011 | Prud'Homme et al. |
| 8,048,950 | B2 | 11/2011 | Prud'Homme et al. |
| 8,129,466 | B2 | 3/2012 | Polk et al. |
| 8,486,363 | B2 | 7/2013 | Hung et al. |
| 8,486,364 | B2 | 7/2013 | Vanier et al. |
| 2003/0032716 | A1* | 2/2003 | White .................. C09D 17/001 524/560 |
| 2004/0247515 | A1* | 12/2004 | Gardner ..................... 423/447.2 |
| 2005/0143327 | A1* | 6/2005 | Hirsch ............................. 514/33 |
| 2005/0271574 | A1 | 12/2005 | Jang et al. |
| 2006/0093885 | A1 | 5/2006 | Krusic et al. |
| 2006/0121279 | A1 | 6/2006 | Petrik |
| 2006/0216222 | A1 | 9/2006 | Jang |
| 2007/0096066 | A1* | 5/2007 | Yoshida et al. ............... 252/511 |
| 2008/0206124 | A1 | 8/2008 | Jang et al. |
| 2009/0022649 | A1 | 1/2009 | Zhamu et al. |
| 2009/0054581 | A1 | 2/2009 | Prud'Homme et al. |
| 2009/0068471 | A1 | 3/2009 | Choi et al. |
| 2009/0110627 | A1 | 4/2009 | Choi et al. |
| 2009/0169467 | A1 | 7/2009 | Zhamu et al. |
| 2010/0000441 | A1* | 1/2010 | Jang ..................... C09D 11/037 106/31.13 |
| 2010/0036023 | A1 | 2/2010 | Weng et al. |
| 2010/0047154 | A1 | 2/2010 | Lee et al. |
| 2010/0055025 | A1 | 3/2010 | Jang et al. |
| 2010/0072430 | A1 | 3/2010 | Gergely et al. |
| 2010/0096597 | A1 | 4/2010 | Prud'Homme et al. |
| 2010/0126660 | A1 | 5/2010 | O'Hara |
| 2010/0247801 | A1 | 9/2010 | Zenasni |
| 2010/0255219 | A1 | 10/2010 | Wenxu et al. |
| 2010/0301212 | A1 | 12/2010 | Dato et al. |
| 2010/0303706 | A1 | 12/2010 | Wallace et al. |
| 2010/0323113 | A1 | 12/2010 | Ramappa et al. |
| 2011/0046289 | A1 | 2/2011 | Zhamu et al. |
| 2012/0142832 | A1 | 6/2012 | Varma et al. |
| 2012/0211160 | A1 | 8/2012 | Asay et al. |
| 2012/0277360 | A1* | 11/2012 | Scheffer ............... C09D 177/00 524/237 |
| 2013/0084236 | A1* | 4/2013 | Hung .................... B82Y 40/00 423/448 |
| 2013/0084237 | A1 | 4/2013 | Vanier et al. |
| 2013/0119321 | A1 | 5/2013 | Lettow |

FOREIGN PATENT DOCUMENTS

| | | |
|---|---|---|
| WO | 9840415 A1 | 9/1998 |
| WO | 2009134492 A2 | 11/2009 |
| WO | 2011012874 A1 | 2/2011 |
| WO | 2013049498 A1 | 4/2013 |
| WO | 2013165677 A1 | 11/2013 |
| WO | 2013166414 A2 | 11/2013 |

OTHER PUBLICATIONS

Coraux, Johann "Growth of Graphene on Ir(111)", New Journal of Physics 11, 2009, 023006 (22pp.).
Dato, Albert et al. "Substrate-Free Gas-Phase Synthesis of Graphene Sheets", Nano Letters, vol. 8, No. 7, 2008, pp. 2012-2016.
Dresselhaus, M.S. et al. "Science of Fullerenes and Carbon Nanotubes", University of Kentucky, Academic Press, Inc., 1995, pp. 60-79.
Du, X.S. et al. "Facile Synthesis of Highly Conductive Polyaniline/ Graphite Nanocomposites" European Polymer Journal 40, 2000, pp. 1489-1493.
Fincke, James R. et al. "Plasma Pyrolysis of Methane to Hydrogen and Carbon Black" Ind. Eng. Chem. Res., 2002, pp. 1425-1435.
Fitzer, E. et al. "Recommended Terminology for the Description of Carbon as a Solid", International Union of Pure and Applied Chemistry, Inorganic Chemistry Division, Pure & Applied Chemistry, vol. 67, No. 3, 1995, pp. 473-506.
Gannon, Richard E. "Acetylene from Hydrocarbons", Kirk-Othmer Encyclopedia of Chemical Technology, 2003.
Gomez De Arco, Lewis et al. "Synthesis, Transfer, and Devices of Single- and Few-Layer Graphene by Chemical Vapor Deposition", IEEE Transactions on Nanotechnology, Vo. 8, No. 2, Mar. 2009, pp. 135-138.
Gonzalez-Aguilar, J. et al. "Carbon Nanostructures Production by Gas-Phase Plasma Processes at Atmospheric Pressure", J. Phys. D: Appl. Phys. 40, 2007, pp. 2361-2374.
Holmen, A. et al. "High-Temperature Pyrolysis of Hydrocarbons. 1. Methane to Acetylene", The Norwegian Institute of Technology, University of Trondheim, Ind. Eng. Chem., Process Des. Dev., vol. 15, No. 3, 1976.
Ji, Liwen et al. "Graphene/Si Multilayer Structure Anodes for Advanced Half and Full Lithium-Ion Cells", Nano Energy, 2011.
Kim, Juhan et al. "Fabrication of Graphene Flakes Composed of Multi-Layer Graphene Sheets using a Thermal Plasma Jet System", Nanotechnology 21, Jan. 29, 2010.
Kim, Keun Su et al. "Continuous Synthesis of Nanostructures Sheetlike Carbons by Thermal Plasma Decomposition of Methane", IEEE Transactions on Plasma Science, vol. 35, No. 2, Apr. 2007.
Lavoie, Martin "Synthesis of Carbon Black From Propane Using a Thermal Plasma", Master's Thesis in Applied Sciences, University of Sherbrooke, Faculty of Applied Sciences, Department of Chemical Engineering, Quebec, Canada, Sep. 1997.
Malesevic, Alexander et al. "Synthesis of Few-Layer Graphene Via Microwave Plasma-Enhanced Chemical Vapour Deposition", Nanotechnology 19, 2008, 305604 (6pps).
Martin-Gallego, M. et al. "Epoxy-Graphene UV-Cured Nanocomposites", Polymer 52, 2011, pp. 4664-4669.
McWilliams, Andrew "Market Research Report, Graphene: Technologies, Applications, and Markets", BCC Research, Feb. 2011.
Nandamuri, G. et al. "Chemical Vapor Deposition of Graphene Films" Nanotechnology 21, 2010, 145604 (4pp.).
Prasai, Dhiraj et al. "Graphene: Corrosion-Inhibiting Coating" ACS Nano, 6 (2), 2012, pp. 1102-1108.
Pristavita, Ramona et al. "Carbon Blacks Produced by Thermal Plasma: the Influence of the Reactor Geometry on the Product Morphology", Plasma Chem Plasma Process, 30, 2010, pp. 267-279.
Pristavita, Ramona et al. "Carbon Nanoparticle Production by Inductively Coupled Thermal Plasmas: Controlling the Thermal History of Particle Nucleation" Plasma Chem Plasma Process, 31, 2011, pp. 851-866.
Pristavita, Ramona et al., "Carbon Nano-Flakes Produced by an Inductively Coupled Thermal Plasma System for Catalyst Applications", Plasma Chem Plasma Process, 31, 2011, pp. 393-403.
Skinner, Gordon B. "Pyrolysis of Methane and the C2 Hydrocarbons", Monsanto Chemical Co., Research and Engineering Division, Dayton 7, Ohio, pp. 59-68.
Su, Fang-Yuan et al. "Could Graphene Construct an Effective Conducting Network in a High-Power Lithium Ion Battery?" Nano Energy, Feb. 25, 2012.
Subrahmanyam, K.S. et al. "Simple Method of Preparing Graphene Flakes by an Arc-Discharge Method", The Journal of Physical Chemistry C, vol. 113, No. 11, 2009, pp. 4257-4259.
Zhong, Ziyi et al. "Catalytic Growth of Carbon Nanoballs With and Without Cobalt Encapsulation", Chemical Physics Letters 330, 2000, pp. 41-47.

(56) References Cited

OTHER PUBLICATIONS

Khan, M.S. et al. "Survey of Recent Methane Pyrolysis Literature", Industrial and Engineering Chemistry, vol. 62, No. 10, Oct. 1970, pp. 54-59.

* cited by examiner

US 9,574,094 B2

GRAPHENIC CARBON PARTICLE DISPERSIONS AND METHODS OF MAKING SAME

FIELD OF THE INVENTION

The present invention relates to graphenic carbon particle dispersions and methods of making such dispersions.

BACKGROUND OF THE INVENTION

Graphenic carbon particles have many potential uses such as in inks and coatings. However, graphenic carbon particles have been found to be difficult to disperse in various media such as organic solvents and water. Ethyl cellulose has been used as a dispersion aid in attempts to improve the dispersion of graphenic carbon particles. However, the need exists for improved dispersions of graphenic carbon particles in order to improve the properties of inks and coatings and other materials containing such particles. For example, electrical conductivity properties may be improved with improved dispersions of graphenic carbon particles in various types of inks and coatings, such as clear coatings, colored coatings, primer coatings, static dissipative coatings and printed electronics, batteries, capacitors, electric traces, antennas, electrical heating coatings and the like.

SUMMARY OF THE INVENTION

An aspect of the invention provides a dispersion comprising a solvent, graphenic carbon particles dispersed in the solvent, and a polymeric dispersant. The polymeric dispersant comprises a) an anchor block comprising glycidyl (meth)acrylate, 3,4-epoxycyclohexylmethyl(meth)acrylate, 2-(3,4-epoxycyclohexyl)ethyl(meth)acrylate, allyl glycidyl ether and mixtures thereof, reacted with a carboxylic acid comprising 3-hydroxy-2-naphthoic acid, para-nitrobenzoic acid, hexanoic acid, 2-ethyl hexanoic acid, decanoic acid and/or undecanoic acid, and b) at least one tail block comprising at least one (meth)acrylic acid alkyl ester.

Another aspect of the invention provides an electrically conductive coating produced from a dispersion comprising a solvent, graphenic carbon particles dispersed in the solvent, and a polymeric dispersant. The polymeric dispersant comprises a) an anchor block comprising glycidyl (meth)acrylate, 3,4-epoxycyclohexylmethyl(meth)acrylate, 2-(3,4-epoxycyclohexyl)ethyl(meth)acrylate, allyl glycidyl ether and mixtures thereof, reacted with a carboxylic acid comprising 3-hydroxy-2-naphthoic acid, para-nitrobenzoic acid, hexanoic acid, 2-ethyl hexanoic acid, decanoic acid and/or undecanoic acid, and b) at least one tail block comprising at least one (meth)acrylic acid alkyl ester.

A further aspect of the invention provides a method of dispersing graphenic carbon particles in a solvent comprising mixing the graphenic carbon particles in the solvent in the presence of a polymeric dispersant comprising a) an anchor block comprising glycidyl (meth)acrylate, 3,4-epoxycyclohexylmethyl(meth)acrylate, 2-(3,4-epoxycyclohexyl)ethyl(meth)acrylate, allyl glycidyl ether and mixtures thereof, reacted with a carboxylic acid comprising 3-hydroxy-2-naphthoic acid, para-nitrobenzoic acid, hexanoic acid, 2-ethyl hexanoic acid, decanoic acid and/or undecanoic acid, and b) at least one tail block comprising at least one (meth)acrylic acid alkyl ester.

DETAILED DESCRIPTION OF EMBODIMENTS OF THE INVENTION

In accordance with embodiments of the present invention, graphenic carbon particles are dispersed in inks and coatings and other materials through the use of polymeric dispersants to provide desirable properties such as increased electrical conductivity. Although embodiments in which graphenic carbon particles are dispersed within inks and coatings are primarily described herein, it is to be understood that other types of materials having such dispersions are within the scope of the present invention, such as batteries, capacitors, electric traces and the like.

Figure 1:
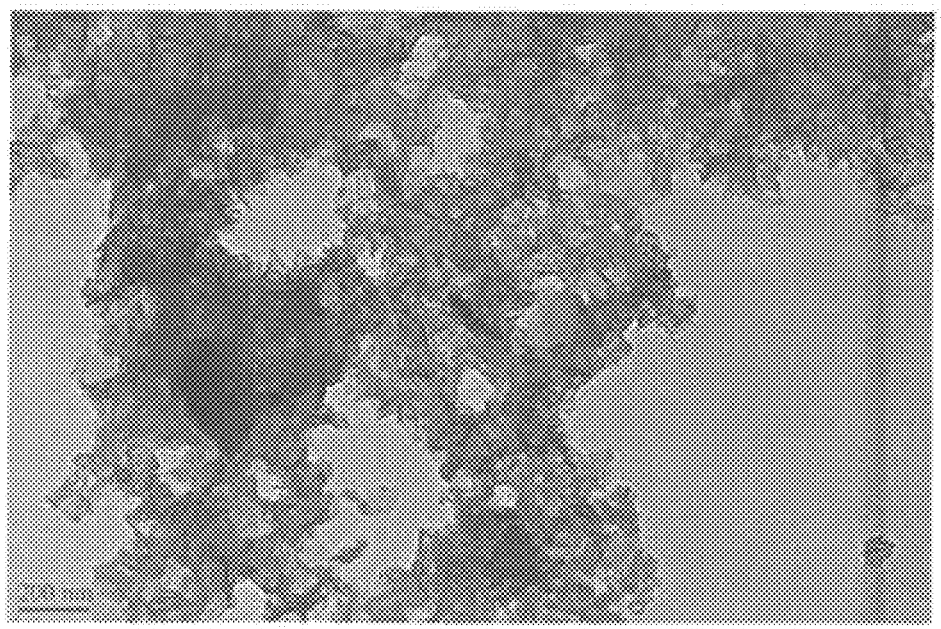
FIGS. 1 and 2 are TEM images showing non-uniform and uniform dispersions of graphenic carbon particles, respectively.
Figure 2:
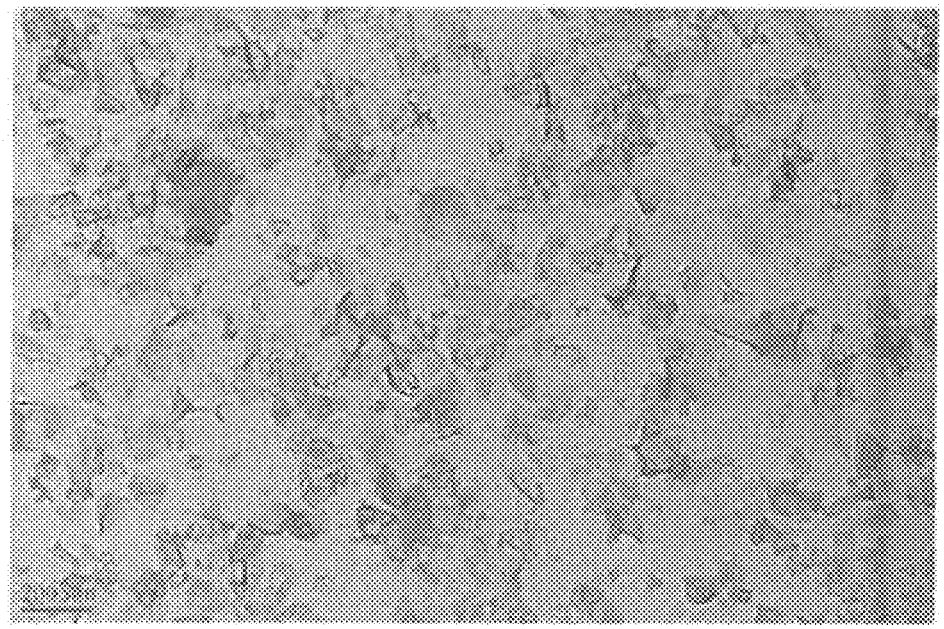

As used herein, the term "dispersed" means that the graphenic carbon particles are dispersed throughout a material without substantial agglomeration of the particles. The presence of agglomerations may be determined by standard methods such as visual analysis of TEM micrograph images. FIGS. 1 and 2 are examples of TEM images showing agglomerated and non-agglomerated graphenic carbon particles, respectively, in a conventional automotive grind resin and a multi-block copolymer dispersant. Agglomerations may also be detected by standard particle size measurement techniques, as well as measurements of electrical conductivity or measurements of optical characteristics of materials containing the graphenic carbon particles such as color, haze, jetness, reflectance and transmission properties.

As used herein, the term "electrically conductive", when referring to an ink or coating containing graphenic carbon particles, means that the ink or coating has an electrical conductivity of at least 0.001 S/m. For example, the coating may have a conductivity of at least 0.01, or at least 10 S/m. Typically the conductivity may be from 100 to 100,000 S/m, or higher. In certain embodiments, the conductivity may be at least 1,000 S/m or at least 10,000 S/m. For example, the conductivity may be at least 20,000 S/m, or at least 30,000 S/m, or at least 40,000 S/m.

In accordance with certain embodiments, the inks or coatings do not exhibit significant electrical conductivity absent the addition of graphenic carbon particles. For example, a cured or dried polymeric resin may have a conductivity that is not measurable, while cured or dried polymeric resins of the present invention including graphenic carbon particles may exhibit conductivities as noted above.

In certain embodiments, the graphenic carbon particles may be dispersed within a matrix material such as a film-forming resin in amounts of from 0.1 to 95 weight percent based on the total solids of the material. For example, the graphenic carbon particles may comprise from 1 to 90 weight percent, or from 5 to 85 weight percent of the material. In certain embodiments, the amount of graphenic carbon particles contained in the materials may be relatively large, such as from 40 or 50 weight percent up to 90 or 95 weight percent. For example, the graphenic carbon particles may comprise from 60 to 85 weight percent, or from 70 to 80 weight percent. In certain embodiments, conductivity properties of ink or coating may be significantly increased with relatively minor additions of the graphenic carbon particles, for example, less than 50 weight percent, or less than 30 weight percent. In certain embodiments, the coatings or other materials have sufficiently high electrical conductivities at relatively low loadings of the graphenic carbon particles. For example, the above-noted electrical conductivities may be achieved at graphenic carbon particle loadings of less than 20 or 15 weight percent. In certain embodiments, the particle loadings may be less than 10 or 8 weight percent, or less than 6 or 5 weight percent. For example, for coatings comprising film-forming polymers or resins that by themselves are non-conductive, the dispersion of from 3 to 5 weight percent of graphenic carbon particles may provide an electrical conductivity of at least 0.1 S/m, e.g., or at least 10 S/m.

The compositions can comprise any of a variety of thermoplastic and/or thermosetting compositions known in the art. For example, the coating compositions can comprise film-forming resins selected from epoxy resins, acrylic polymers, polyester polymers, polyurethane polymers, polyamide polymers, polyether polymers, bisphenol A based epoxy polymers, polysiloxane polymers, styrenes, ethylenes, butylenes, copolymers thereof, and mixtures thereof. Generally, these polymers can be any polymers of these types made by any method known to those skilled in the art. Such polymers may be solvent borne, water soluble or water dispersible, emulsifiable, or of limited water solubility. Furthermore, the polymers may be provided in sol gel systems, may be provided in core-shell polymer systems, or may be provided in powder form. In certain embodiments, the polymers are dispersions in a continuous phase comprising water and/or organic solvent, for example emulsion polymers or non-aqueous dispersions.

In addition to the resin and graphenic carbon particle components, the coatings or other materials in accordance with certain embodiments of the present invention may include additional components conventionally added to coating or ink compositions, such as cross-linkers, pigments, tints, flow aids, defoamers, dispersants, solvents, UV absorbers, catalysts and surface active agents.

Thermosetting or curable coating compositions typically comprise film forming polymers or resins having functional groups that are reactive with either themselves or a cross-linking agent. The functional groups on the film-forming resin may be selected from any of a variety of reactive functional groups including, for example, carboxylic acid groups, amine groups, epoxide groups, hydroxyl groups, thiol groups, carbamate groups, amide groups, urea groups, isocyanate groups (including blocked isocyanate groups and tris-alkylcarbamoyltriazine) mercaptan groups, styrenic groups, anhydride groups, acetoacetate acrylates, uretidione and combinations thereof.

Thermosetting coating compositions typically comprise a crosslinking agent that may be selected from, for example, aminoplasts, polyisocyanates including blocked isocyanates, polyepoxides, beta-hydroxyalkylamides, polyacids, anhydrides, organometallic acid-functional materials, polyamines, polyamides, and mixtures of any of the foregoing. Suitable polyisocyanates include multifunctional isocyanates. Examples of multifunctional polyisocyanates include aliphatic diisocyanates like hexamethylene diisocyanate and isophorone diisocyanate, and aromatic diisocyanates like toluene diisocyanate and 4,4'-diphenylmethane diisocyanate. The polyisocyanates can be blocked or unblocked. Examples of other suitable polyisocyanates include isocyanurate trimers, allophanates, and uretidiones of diisocyanates. Examples of commercially available polyisocyanates include DESMODUR N3390, which is sold by Bayer Corporation, and TOLONATE HDT90, which is sold by Rhodia Inc. Suitable aminoplasts include condensates of amines and or amides with aldehyde. For example, the condensate of melamine with formaldehyde is a suitable aminoplast. Suitable aminoplasts are well known in the art. A suitable aminoplast is disclosed, for example, in U.S. Pat. No. 6,316,119 at column 5, lines 45-55, incorporated by reference herein. In certain embodiments, the resin can be self crosslinking. Self crosslinking means that the resin contains functional groups that are capable of reacting with themselves, such as alkoxysilane groups, or that the reaction product contains functional groups that are coreactive, for example hydroxyl groups and blocked isocyanate groups.

The dry film thickness of the cured coatings may typically range from less than 0.5 microns to 100 microns or more, for example, from 1 to 50 microns. As a particular example, the cured coating thickness may range from 1 to 15 microns. However, significantly greater coating thicknesses, and significantly greater material dimensions for non-coating materials, are within the scope of the invention.

As used herein, the term "graphenic carbon particles" means carbon particles having structures comprising one or more layers of one-atom-thick planar sheets of $sp^2$-bonded carbon atoms that are densely packed in a honeycomb crystal lattice. The average number of stacked layers may be less than 100, for example, less than 50. In certain embodiments, the average number of stacked layers is 30 or less, such as 20 or less, 10 or less, or, in some cases, 5 or less. The graphenic carbon particles may be substantially flat, however, at least a portion of the planar sheets may be substantially curved, curled, creased or buckled.

The graphenic carbon particles to be dispersed in the compositions of the present invention are may be made by thermal processes. In accordance with embodiments of the invention, thermally produced graphenic carbon particles are made from carbon-containing precursor materials that are heated to high temperatures in a thermal zone such as a plasma. As more fully described below, the carbon-containing precursor materials are heated to a sufficiently high temperature, e.g., above 3,500° C., to produce graphenic carbon particles having characteristics as described above. The carbon-containing precursor, such as a hydrocarbon provided in gaseous or liquid form, is heated in the thermal zone to produce the graphenic carbon particles in the thermal zone or downstream therefrom. For example, thermally produced graphenic carbon particles may be made by the systems and methods disclosed in U.S. Pat. Nos. 8,486,363 and 8,486,364.

In certain embodiments, the thermally produced graphenic carbon particles may be made by using the apparatus and method described in U.S. Pat. No. 8,486,363 at [0022] to [0048] in which (i) one or more hydrocarbon precursor materials capable of forming a two-carbon fragment species (such as n-propanol, ethane, ethylene, acetylene, vinyl chloride, 1,2-dichloroethane, allyl alcohol, propionaldehyde, and/or vinyl bromide) is introduced into a thermal zone (such as a plasma), and (ii) the hydrocarbon is heated in the thermal zone to form the graphenic carbon particles. In other embodiments, the thermally produced graphenic carbon particles may be made by using the apparatus and method described in U.S. Pat. No. 8,486,364 at [0015] to [0042] in which (i) a methane precursor material (such as a material comprising at least 50 percent methane, or, in some cases, gaseous or liquid methane of at least 95 or 99 percent purity or higher) is introduced into a thermal zone (such as a plasma), and (ii) the methane precursor is heated in the thermal zone to form the graphenic carbon particles. Such methods can produce graphenic carbon particles having at least some, in some cases all, of the characteristics described above.

During production of the graphenic carbon particles by the thermal production methods described above, a carbon-containing precursor is provided as a feed material that may be contacted with an inert carrier gas. The carbon-containing precursor material may be heated in a thermal zone, for example, by a plasma system. In certain embodiments, the precursor material is heated to a temperature of at least 3,500° C., for example, from a temperature of greater than 3,500° C. or 4,000° C. up to 10,000° C. or 20,000° C. Although the thermal zone may be generated by a plasma system, it is to be understood that any other suitable heating system may be used to create the thermal zone, such as various types of furnaces including electrically heated tube furnaces and the like.

The gaseous stream may be contacted with one or more quench streams that are injected into the plasma chamber through at least one quench stream injection port. The quench stream may cool the gaseous stream to facilitate the formation or control the particle size or morphology of the graphenic carbon particles. In certain embodiments of the invention, after contacting the gaseous product stream with the quench streams, the ultrafine particles may be passed through a converging member. After the graphenic carbon particles exit the plasma system, they may be collected. Any suitable means may be used to separate the graphenic carbon particles from the gas flow, such as, for example, a bag filter, cyclone separator or deposition on a substrate.

In certain embodiments, the graphenic carbon particles may be obtained from commercial sources, for example, from Angstron, XG Sciences and other commercial sources. In such embodiments, the commercially available graphenic carbon particles may comprise exfoliated graphite and have different characteristics in comparison with the thermally produced graphenic carbon particles, such as different size distributions, thicknesses, aspect ratios, structural morphologies, oxygen content, and chemical functionality at the basal planes/edges.

In certain embodiments, different types of graphenic carbon particles may be dispersed in the composition. For example, when thermally produced graphenic carbon particles are combined with commercially available graphenic carbon particles in accordance with embodiments of the invention, a bi-modal distribution, tri-modal distribution, etc. of graphenic carbon particle characteristics may be achieved. The graphenic carbon particles contained in the compositions may have multi-modal particle size distributions, aspect ratio distributions, structural morphologies, edge functionality differences, oxygen content, and the like.

In an embodiment of the present invention in which both thermally produced graphenic carbon particles and commercially available graphenic carbon particles, e.g., from exfoliated graphite, are added to a coating composition to produce a bi-modal graphenic particle size distribution, the relative amounts of the different types of graphenic carbon particles are controlled to produce desired conductivity properties of the coatings. For example, the thermally produced graphenic particles may comprise from 1 to 50 weight percent, and the commercially available graphenic carbon particles may comprise from 50 to 99 weight percent, based on the total weight of the graphenic carbon particles. In certain embodiments, the thermally produced graphenic carbon particles may comprise from 2 to 20 weight percent, or from 5 to 10 or 12 weight percent.

In certain embodiments, the coating compositions or other materials produced with the present dispersions are substantially free of certain components such as polyalkyleneimines, graphite, or other components. For example, the term "substantially free of polyalkyleneimines" means that polyalkyleneimines are not purposefully added, or are present as impurities or in trace amounts, e.g., less than 1 weight percent or less than 0.1 weight percent. The term "substantially free of graphite" means that graphite is not purposefully added, or is present as an impurity or in trace amounts, e.g., less than 1 weight percent or less than 0.1 weight percent. In certain embodiments, graphite in minor amounts may be present in the materials, e.g., less than 5 weight percent or less than 1 weight percent of the material. If graphite is present, it is typically in an amount less than the graphenic carbon particles, e.g., less than 30 weight percent based on the combined weight of the graphite and graphenic carbon particles, for example, less than 20 or 10 weight percent.

In certain embodiments, the compositions of the present invention are prepared from a dispersion comprising: (a) graphenic carbon particles such as any of those described above; (b) a carrier that may be selected from water, at least one organic solvent, or combinations of water and at least one organic solvent; (c) a polymeric dispersant, such as the copolymer described generally below; and, optionally, (d) at least one resin as described above or other additives.

Certain compositions of the present invention comprise a polymeric dispersant. In certain embodiments, such a polymeric dispersant comprises a tri-block copolymer comprising: (i) a first segment comprising graphenic carbon affinic groups, such as hydrophobic aromatic groups; (ii) a second segment comprising polar groups, such as hydroxyl groups, amine groups, ether groups, and/or acid groups; and (iii) a third segment which is different from the first segment and the second segment, such as a segment that is substantially non-polar, i.e., substantially free of polar groups. As used herein, term "substantially free" when used with reference to the absence of groups in a polymeric segment, means that no more than 5% by weight of the monomer used to form the third segment comprises polar groups.

Suitable polymeric dispersants include acrylic copolymers produced from atom transfer radical polymerization. In certain embodiments, such copolymers have a weight average molecular weight of 1,000 to 20,000.

In certain embodiments, the polymeric pigment dispersant has a polymer chain structure represented by the following general formula (I),

$$\Phi\text{-}(G)_p\text{-}(W)_q\text{-}(Y)_s T \qquad (I)$$

wherein G is a residue of at least one radically polymerizable ethylenically unsaturated monomer; W and Y are residues of at least one radically polymerizable ethylenically unsaturated monomer with W and Y being different from one another; Y is optional; Φ is a hydrophobic residue of or derived from an initiator and is free of the radically transferable group; T is or is derived from the radically transferable group of the initiator; p, q and s represent average numbers of residues occurring in a block of residues; p, q and s are each individually selected such that the polymeric dispersant has a number average molecular weight of at least 250.

The polymeric dispersant may be described generally as having a head and tail structure, i.e., as having a polymeric head portion and a polymeric tail portion. The polymeric tail portion may have a hydrophilic portion and a hydrophobic portion, particularly at the terminus thereof. While not intending to be bound by any theory, it is believed that the polymeric head portion of the polymeric dispersant can be associated with the graphenic carbon particles, while the polymeric tail portion aids in dispersing the graphenic carbon particles and can be associated with other components of an ink or coating composition. As used herein, the terms "hydrophobic" and "hydrophilic" are relative to each other.

In certain embodiments, the polymeric dispersant is prepared by atom transfer radical polymerization (ATRP). The ATRP process can be described generally as comprising: polymerizing one or more radically polymerizable monomers in the presence of an initiation system; forming a polymer; and isolating the formed polymer. In certain embodiments, the initiation system comprises: a monomeric initiator having a single radically transferable atom or group; a transition metal compound, i.e., a catalyst, which participates in a reversible redox cycle with the initiator; and a ligand, which coordinates with the transition metal compound. The ATRP process is described in further detail in International Patent Publication No. WO 98/40415 and U.S. Pat. Nos. 5,807,937, 5,763,548 and 5,789,487.

Catalysts that may be used in the ATRP preparation of the polymeric dispersant include any transition metal compound that can participate in a redox cycle with the initiator and the growing polymer chain. It may be preferred that the transition metal compound not form direct carbon-metal bonds with the polymer chain. Transition metal catalysts useful in the present invention may be represented by the following general formula (II),

$$M^{n+}X_n \quad (II)$$

wherein M is the transition metal; n is the formal charge on the transition metal having a value of from 0 to 7; and X is a counterion or covalently bonded component. Examples of the transition metal M include, but are not limited to, Cu, Fe, Au, Ag, Hg, Pd, Pt, Co, Mn, Ru, Mo, Nb and Zn. Examples of X include, but are not limited to, halide, hydroxy, oxygen, $C_1$-$C_6$-alkoxy, cyano, cyanato, thiocyanato and azido. In one specific example, the transition metal is Cu(I) and X is halide, for example, chloride. Accordingly, one specific class of transition metal catalysts is the copper halides, for example, Cu(I)Cl. In certain embodiments, the transition metal catalyst may contain a small amount, for example, 1 mole percent, of a redox conjugate, for example, Cu(II)Cl$_2$ when Cu(I)Cl is used. Additional catalysts useful in preparing the polymeric dispersant are described in U.S. Pat. No. 5,807,937 at column 18, lines 29 through 56. Redox conjugates are described in further detail in U.S. Pat. No. 5,807,937 at column 11, line 1 through column 13, line 38.

Ligands that may be used in the ATRP preparation of the polymeric dispersant include, but are not limited to, compounds having one or more nitrogen, oxygen, phosphorus and/or sulfur atoms, which can coordinate to the transition metal catalyst compound, for example, through sigma and/or pi bonds. Classes of useful ligands include, but are not limited to, unsubstituted and substituted pyridines and bipyridines; porphyrins; cryptands; crown ethers; for example, 18-crown-6; polyamines, for example, ethylenediamine; glycols, for example, alkylene glycols, such as ethylene glycol; carbon monoxide; and coordinating monomers, for example, styrene, acrylonitrile and hydroxyalkyl (meth)acrylates. As used herein, the term "(meth)acrylate" and similar terms refer to acrylates, methacrylates and mixtures of acrylates and methacrylates. One specific class of ligands are the substituted bipyridines, for example, 4,4'-dialkyl-bipyridyls. Additional ligands that may be used in preparing polymeric dispersant are described in U.S. Pat. No. 5,807,937 at column 18, line 57 through column 21, line 43.

Classes of monomeric initiators that may be used in the ATRP preparation of the polymeric dispersant include, but are not limited to, aliphatic compounds, cycloaliphatic compounds, aromatic compounds, polycyclic aromatic compounds, heterocyclic compounds, sulfonyl compounds, sulfenyl compounds, esters of carboxylic acids, nitrites, ketones, phosphonates and mixtures thereof, each having a radically transferable group, and preferably a single radically transferable group. The radically transferable group of the monomeric initiator may be selected from, for example, cyano, cyanato, thiocyanato, azido and halide groups. The monomeric initiator may also be substituted with functional groups, for example, oxyranyl groups, such as glycidyl groups. Additional useful initiators are described in U.S. Pat. No. 5,807,937 at column 17, line 4 through column 18, line 28.

In certain embodiments, the monomeric initiator is selected from 1-halo-2,3-epoxypropane, p-toluenesulfonyl halide, p-toluenesulfenyl halide, $C_6$-$C_{20}$-alkyl ester of alpha-halo-$C_2$-$C_6$-carboxylic acid, halomethylbenzene, (1-haloethyl)benzene, halomethylnaphthalene, halomethylanthracene and mixtures thereof. Examples of $C_2$-$C_6$-alkyl ester of alpha-halo-$C_2$-$C_6$-carboxylic acids include, hexyl alpha-bromopropionate, 2-ethylhexyl alpha-bromopropionate, 2-ethylhexyl alpha-bromohexionate and icosanyl alpha-bromopropionate. As used herein, the term "monomeric initiator" is meant to be distinguishable from polymeric initiators, such as polyethers, polyurethanes, polyesters and acrylic polymers having radically transferable groups.

In the ATRP preparation, the polymeric dispersant and the amounts and relative proportions of monomeric initiator, transition metal compound and ligand may be those for which ATRP is most effectively performed. The amount of initiator used can vary widely and is typically present in the reaction medium in a concentration of from $10^{-4}$ moles/liter (M) to 3 M, for example, from $10^{-3}$ M to $10^{-1}$ M. As the molecular weight of the polymeric dispersant can be directly related to the relative concentrations of initiator and monomer(s), the molar ratio of initiator to monomer is an important factor in polymer preparation. The molar ratio of initiator to monomer is typically within the range of $10^{-4}$:1 to 0.5:1, for example, $10^{-3}$:1 to $5 \times 10^{-2}$:1.

In preparing the polymeric dispersant by ATRP methods, the molar ratio of transition metal compound to initiator is typically in the range of $10^{-4}$:1 to 10:1, for example, 0.1:1 to 5:1. The molar ratio of ligand to transition metal compound is typically within the range of 0.1:1 to 100:1, for example, 0.2:1 to 10:1.

The polymeric dispersant may be prepared in the absence of solvent, i.e., by means of a bulk polymerization process. Often, the polymeric dispersant is prepared in the presence of a solvent, typically water and/or an organic solvent. Classes of useful organic solvents include, but are not limited to, esters of carboxylic acids, ethers, cyclic ethers, $C_5$-$C_{10}$ alkanes, $C_5$-$C_8$ cycloalkanes, aromatic hydrocarbon solvents, halogenated hydrocarbon solvents, amides, nitrites, sulfoxides, sulfones and mixtures thereof. Supercritical solvents, such as $CO_2$, $C_1$-$C_4$ alkanes and fluorocarbons, may also be employed. One class of solvents is the aromatic hydrocarbon solvents, such as xylene, toluene, and mixed aromatic solvents such as those commercially available from Exxon Chemical America under the trademark SOLVESSO. Additional solvents are described in further detail in U.S. Pat. No. 5,807,937, at column 21, line 44 through column 22, line 54.

The ATRP preparation of the polymeric dispersant is typically conducted at a reaction temperature within the range of 25° C. to 140° C., for example, from 50° C. to 100° C., and a pressure within the range of 1 to 100 atmospheres, usually at ambient pressure.

The ATRP transition metal catalyst and its associated ligand are typically separated or removed from the polymeric dispersant prior to its use in the polymeric dispersants of the present invention. Removal of the ATRP catalyst may be achieved using known methods, including, for example, adding a catalyst binding agent to the mixture of the polymeric dispersant, solvent and catalyst, followed by filtering. Examples of suitable catalyst binding agents include, for example, alumina, silica, clay or a combination thereof. A mixture of the polymeric dispersant, solvent and ATRP catalyst may be passed through a bed of catalyst binding agent. Alternatively, the ATRP catalyst may be oxidized in situ, the oxidized residue of the catalyst being retained in the polymeric dispersant.

With reference to general formula (I), G may be a residue of at least one radically polymerizable ethylenically unsaturated monomer, such as a monomer selected from an oxirane functional monomer reacted with a carboxylic acid which may be an aromatic carboxylic acid or polycyclic aromatic carboxylic acid.

The oxirane functional monomer or its residue that is reacted with a carboxylic acid may be selected from, for example, glycidyl (meth)acrylate, 3,4-epoxycyclohexylmethyl(meth)acrylate, 2-(3,4-epoxycyclohexyl)ethyl(meth)acrylate, allyl glycidyl ether and mixtures thereof. Examples of carboxylic acids that may be reacted with the oxirane functional monomer or its residue include, but are not limited to, napthoic acid, hydroxy napthoic acids, para-nitrobenzoic acid and mixtures thereof.

With continued reference to general formula (I), in certain embodiments, W and Y may each independently be residues of, include, but are not limited to, methyl (meth)acrylate, ethyl (meth)acrylate, propyl (meth)acrylate, isopropyl (meth)acrylate, n-butyl (meth)acrylate, iso-butyl (meth) acrylate, tert-butyl (meth)acrylate, 2-ethylhexyl (meth)acrylate, lauryl (meth)acrylate, isobornyl (meth)acrylate, cyclohexyl (meth)acrylate, 3,3,5-trimethylcyclohexyl (meth) acrylate, isocane (meth)acrylate, hydroxyethyl (meth) acrylate, hydroxypropyl (meth)acrylate, hydroxybutyl (meth)acrylate, butyl (meth)acrylate, methoxy poly(ethylene glycol) mono(meth)acrylate, poly(ethylene glycol) mono(meth)acrylate, methoxy poly(propylene glycol) mono (meth)acrylate, poly(propylene glycol) mono (meth)acrylate, methoxy copoly(ethylene glycol/propylene glycol) mono (meth)acrylate, copoly(ethylene glycol/propylene glycol) mono (meth)acrylate.

In general formula (I), in certain embodiments, W and Y may each independently be residues of monomers having more than one (meth)acryloyl group, such as (meth)acrylic anhydride, diethyleneglycol bis(meth)acrylate, 1,4-butanediol diacrylate, 1,6-hexanediol diacrylate, 4,4'-isopropylidenediphenol bis(meth)acrylate (Bisphenol A di(meth) acrylate), alkoxylated 4,4'-isopropylidenediphenol bis (meth)acrylate, trimethylolpropane tris(meth)acrylate, alkoxylated trimethylolpropane tris(meth)acrylate, polyethylene glycol di(meth)acrylate, polypropylene glycol di(meth)acrylate, and copoly(ethylene glycol/propylene glycol) di(meth)acrylate.

The numerals p, q and s represent the average total number of G, W and Y residues, respectively, occurring per block or segment of G residues (G-block or G-segment), W residues (W-block or W-segment) and Y residues (Y-block G or Y-segment), respectively. When containing more than one type or species of monomer residue, the W- and Y-blocks may each have at least one of random block (e.g., di-block and tri-block), alternating, and gradient architectures. Gradient architecture refers to a sequence of different monomer residues that change gradually in a systematic and predictable manner along the polymer backbone. For purposes of illustration, a W-block containing 6 residues of butyl methacrylate (BMA) and 6 residues of hydroxy propyl methacrylate (HPMA), for which q is 12, may have di-block, tetra-block, alternating and gradient architectures as described in U.S. Pat. No. 6,642,301, col. 10, lines 5-25. In certain embodiments, the G-block may include about 5-15 residues of glycidyl(meth)acrylate) reacted with an aromatic carboxylic acid (such as 3-hydroxy-2-napthoic acid), the W-block may be a random block of about 20-30 BMA and HPMA residues and the Y-block may be a uniform block of about 5-15 butyl acrylate (BA) residues.

The order in which monomer residues occur along the polymer backbone of the polymeric dispersant is typically determined by the order in which the corresponding monomers are fed into the vessel in which the controlled radical polymerization is conducted. For example, the monomers that are incorporated as residues in the G-block of the polymeric dispersant are generally fed into the reaction vessel prior to those monomers that are incorporated as residues in the W-block, followed by the residues of the Y-block.

During formation of the W- and Y-blocks, if more than one monomer is fed into the reaction vessel at a time, the relative reactivities of the monomers typically determines the order in which they are incorporated into the living polymer chain. Gradient sequences of monomer residues within the W- and Y-blocks can be prepared by controlled radical polymerization, and, in particular, by ATRP methods by (a) varying the ratio of monomers fed to the reaction medium during the course of the polymerization, (b) using a monomer feed containing monomers having different rates of polymerization, or (c) a combination of (a) and (b). Copolymers containing gradient architecture are described in further detail in U.S. Pat. No. 5,807,937, at column 29, line 29 through column 31, line 35.

In certain embodiments, subscripts q and s each have a value of at least 1, such as at least 5 for general formula (I). Also, subscript s often has a value of less than 300, such as less than 100, or less than 50 (for example 20 or less) for general formula (I). The values of subscripts q and s may range between any combination of these values, inclusive of the recited values, for example, s may be a number from 1 to 100. Subscript p may have a value of at least 1, such as at least 5. Subscript p also often has a value of less than 300, such as less than 100 or less than 50 (e.g., 20 or less). The value of subscript p may range between any combination of these values, inclusive of the recited values, for example, p may be a number up to 50. The polymeric dispersant often has a number average molecular weight (Mn) of from 250 to 40,000, for example, from 1000 to 30,000 or from 2000 to 20,000, as determined by gel permeation chromatography using polystyrene standards.

Symbol Φ of general formula (I) is, or is derived from, the residue of the initiator used in the preparation of the polymeric dispersant by controlled radical polymerization, and is free of the radically transferable group of the initiator. For example, when the polymeric dispersant is initiated in the presence of toluene sulfonyl chloride, the symbol Φ, more specifically Φ−, is the residue,

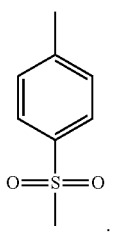

The symbol Φ may also represent a derivative of the residue of the initiator.

In general formula (I), T is or is derived from the radically transferable group of the ATRP initiator. The residue of the radically transferable group may be (a) left on the polymeric dispersant, (b) removed or (c) chemically converted to another moiety. The radically transferable group may be removed by substitution with a nucleophilic compound, for example, an alkali metal alkoxylate. When the residue of the radically transferable group is, for example, a cyano group (—CN), it can be converted to an amide group or carboxylic acid group by methods known in the art.

The polymeric dispersant is typically present in the graphenic carbon particle dispersion described above in an amount of at least 0.1 percent by weight, such as at least 0.5 percent by weight, or, in some cases, at least 1 percent by weight, based on the total weight of the graphenic carbon particle dispersion. The polymeric dispersant may typically be present in the graphenic carbon particle dispersion in an amount of less than 75 percent by weight, or less than 50 percent by weight, based on the total weight of the graphenic carbon particle dispersion. In certain embodiments, the polymeric dispersant may be present in the graphenic carbon particle dispersion in an amount of less than 30 percent by weight, or less than 15 percent by weight, based on the total weight of the graphenic carbon particle dispersion.

The graphenic carbon particle dispersion often also comprises at least water and/or at least one organic solvent. Classes of organic solvents that may be present include, but are not limited to, xylene, toluene, alcohols, for example, methanol, ethanol, n-propanol, iso-propanol, n-butanol, sec-butyl alcohol, tert-butyl alcohol, iso-butyl alcohol, furfuryl alcohol and tetrahydrofurfuryl alcohol; ketones or ketoalcohols, for example, acetone, methyl ethyl ketone, and diacetone alcohol; ethers, for example, dimethyl ether and methyl ethyl ether; cyclic ethers, for example, tetrahydrofuran and dioxane; esters, for example, ethyl acetate, ethyl lactate, ethylene carbonate and propylene carbonate; polyhydric alcohols, for example, ethylene glycol, diethylene glycol, triethylene glycol, propylene glycol, tetraethylene glycol, polyethylene glycol, glycerol, 2-methyl-2,4-pentanediol and 1,2,6-hexantriol; hydroxy functional ethers of alkylene glycols, for example, butyl 2-hydroxyethyl ether, hexyl 2-hydroxyethyl ether, methyl 2-hydroxypropyl ether and phenyl 2-hydroxypropyl ether; nitrogen containing cyclic compounds, for example, pyrrolidone, N-methyl-2-pyrrolidone and 1,3-dimethyl-2-imidazolidinone; and sulfur containing compounds such as thioglycol, dimethyl sulfoxide and tetramethylene sulfone. When the solvent comprises water, it can be used alone or in combination with organic solvents such as propylene glycol monomethylether, ethanol and the like.

The graphenic carbon particle dispersion may be prepared by methods that are known to those of ordinary skill in the art. Such known methods typically involve the use of energy intensive mixing or grinding means, such as ball mills or media mills (e.g., sand mills).

The graphenic carbon particles may be mixed with film-forming resins and other components of the compositions. For example, for two-part coating systems, the graphenic carbon particles may be dispersed into part A and/or part B. In certain embodiments, the graphenic carbon particles are dispersed into part A by various mixing techniques such as sonication, high speed mixing, media milling and the like. In certain embodiments, the graphenic carbon particles may be mixed into the coating compositions using high-energy and/or high-shear techniques such as sonication, 3-roll milling, ball milling, attritor milling, rotor/stator mixers, and the like.

The following examples are intended to illustrate various aspects of the invention, and are not intended to limit the scope of the invention.

Example 1

Compositions A, B, C, and D listed in Table 1 were dispersed by adding 70 g of each into 8 oz. glass jars with 220 g of SEPR Ermil 1.0-1.25 mm milling media. The samples in the jars were shaken for 4 hours using a Lau disperser (Model DAS 200, Lau, GmbH). The milling media was then filtered off from the dispersions. Compositions E, F and G listed in Table 1 were dispersed at 12.5 weight percent based on total solids by sonicating for 2 hours in a bath sonicator in (E) n-methyl-2-pyrrolidone, (F) methyl ether propylene glycol (Dowanol PM Acetate, Dow Chemical), and (G) n, n-dimethylacetimide.

TABLE 1

Solvent-Borne Dispersions

| Ingredients | Samples (Weight %) | | | | | | |
|---|---|---|---|---|---|---|---|
| | A | B | C | D | E | F | G |
| Acrylic grind vehicle | 34.32 | 34.32 | | | | | |
| Polyester resin solution | 15.43 | 15.43 | | | | | |
| Polyethylene cut | 0.48 | 0.48 | | | | | |
| n-butyl acetate | 36.70 | 36.70 | 48.72 | 62.21 | | | |
| Diisobutyl ketone | 7.53 | 7.53 | | | | | |
| n-methly-2-pyrrolidone | | | | | 87.5 | | |
| Methyl ether propylene glycol | | | | | | 87.5 | |
| n,n-dimethylacetimide | | | | | | | 87.5 |
| Solvent-borne block copolymer dispersant[1] | | | 42.73 | 31.49 | | | |

TABLE 1-continued

Solvent-Borne Dispersions

| Ingredients | Samples (Weight %) | | | | | | |
|---|---|---|---|---|---|---|---|
| | A | B | C | D | E | F | G |
| xGnP C-300[2] | 5.56 | | 8.55 | | | | |
| Thermally produced graphenic carbon[3] | | 5.56 | | 6.30 | 12.5 | 12.5 | 12.5 |

[1]43 weight % n-butyl acetate and 57 weight % block copolymer as disclosed in U.S. 2008/0188610
[2]exfoliated graphenic carbon particles from XG Sciences
[3]thermally produced graphenic carbon produced in accordance with the method disclosed in U.S. Pat. No. 8,486,364 having a measured BET surface area of 280 m$^2$/g Example 2

The dispersed formulations from Example 1 (Samples 1A, 1B, 1C, 1D, 1E, 1F and 1G) were added to a commercial solvent-borne black basecoat available from PPG Industries, Inc., at a level such that each basecoat formulation contained 2.36% graphenic carbon particles on a total solids basis, resulting in Samples 2A, 2B, 2C, 2D, 2E, 2F and 2G, respectively. In each paint formulation, the graphenic carbon replaced the same weight of black pigment that is normally contained in this solvent-borne black basecoat. Samples 2E, 2F and 2G were gritty, showing the poor dispersion resulting from sonicating the graphenic carbon particles in solvents.

Example 3

Samples 2A, 2B, 2C and 2D from Example 2 were reduced with n-butyl acetate to spray viscosity, and then sprayed onto e-coated 4×12 inch steel panels. These panels received a standard ambient flash and were then clear coated with a commercial carbamate clear coat available from PPG Industries, Inc. and cured in an oven to produce Samples 3A, 3B, 3C and 3D.

To quantify the goodness of dispersion of the graphenic carbon particles in Samples 3A, 3B, 3C and 3D, the color of each panel was measured using a BYKmac multi-angle spectrophotometer (BYK-Gardner) and the black jetness was calculated using the 110° angle color data. Jetness was calculated using the equation Jetness=$[\log_{10}(X_n/X)+ \log_{10}(Y_n/Y)-\log_{10}(Z_n/Z)]$ (Equation 12 from K. Lippok-Lohmer, "Praxisnahe Scharzmessungen", Farbe+Lack, 92 (1986) 1024-1029.) If the graphenic carbon particles are well dispersed in the paint film, then the resulting light scattering will be reduced and this results in a larger black jetness value.

The resultant test data is shown in Table 2. For each type of graphenic carbon particle the dispersion of the particles was improved by using the tri-block copolymer dispersant, as shown by an increase in jetness. The paints from the sonicated dispersions (Examples 2E, 2F and 2G) were not sprayed, but would necessarily have displayed extremely poor (low) jetness, due to the state of agglomeration of the graphenic carbon particles in these paints. The use of the tri-block copolymer dispersant results in significant improvement in dispersing graphenic carbon particles compared with conventional solvent sonication methods and conventional grind resin technology.

TABLE 2

| | Color Measurements | | | |
|---|---|---|---|---|
| Sample Panel | L* 110° | a* 110° | b* 110° | Jetness |
| 3A | 6.03 | 0.07 | 0.15 | 217 |
| 3B | 1.89 | 0.02 | −0.11 | 269 |
| 3C | 5.32 | 0.14 | 0.32 | 221 |
| 3D | 1.63 | −0.04 | −0.26 | 279 |

Example 4

Compositions listed in Table 3 were dispersed by adding 70 g of each into 8 oz. glass jars with 220 g of SEPR Ermil 1.0-1.25 mm milling media. The samples in the jars were shaken for 4 hours using a Lau disperser (Model DAS 200, Lau, GmbH). The milling media was then filtered off from the dispersions. Samples 4J, 4K and 4L were made by mixing, respectively, Samples 4A and 4E, Samples 4B and 4G, and Samples 4C and 4I, to form compositions containing two types of graphenic carbon particles where 92 weight % of the total graphenic carbon consisted of xGnP M-25 from XG Sciences and 8 weight % of the total graphenic carbon was that produced in accordance with the method disclosed in U.S. Pat. No. 8,486,364 having a measured BET surface area of 280 m$^2$/g.

TABLE 3

| | Dispersions | | | | | | | | |
|---|---|---|---|---|---|---|---|---|---|
| Ingre- | Weight % | | | | | | | | |
| dients | A | B | C | D | E | F | G | H | I |
| Ethyl cellulose | 1.67 | | | 1.67 | 1.67 | | | | |
| Solvent-borne block co-polymer dispersant[1] | | 2.92 | | | | 2.92 | 2.92 | | |
| Water-borne block copolymer dispersant | | | 1.71 | | | | | 1.71 | 1.71 |
| n-butyl acetate | | | | | | | 87.08 | | |
| Ethanol | | | | | 88.33 | | | | |
| n-methyl-2-pyrrolidone | 88.33 | 87.08 | | | | 88.33 | | 87.08 | |

TABLE 3-continued

Dispersions

| Ingredients | Weight % | | | | | | | | |
|---|---|---|---|---|---|---|---|---|---|
| | A | B | C | D | E | F | G | H | I |
| De-ionized water | | 44.15 | | | | | | 88.29 | 44.15 |
| Propylene glycol monometheylether[2] | | | 44.15 | | | | | | 44.15 |
| xGnP M-25[3] | 10.00 | 10.00 | 10.00 | | | | | | |
| Thermally produced graphenic carbon[4] | | | | 10.00 | 10.00 | 10.00 | 10.00 | 10.00 | 10.00 |

[1]solvent-borne block copolymer dispersant as disclosed in U.S. Pat. No. 8,129,466
[2]propylene glycol monometheylether (Dowanol PM, Dow Chemical Co)
[3]xGnP M-25 (XG Sciences)
[4]thermally produced graphenic carbon particles produced in accordance with the method disclosed in U.S. Pat. No. 8,486,364 having a measured BET surface area of 280 m$^2$/g The waterborne block copolymer dispersant listed in Table 4 was made from a mixture of the following ingredients in weight ratios listed in Table 4.

TABLE 4

| Charge 1 | |
|---|---|
| 2,2'-Bipyridyl | 2.7 |
| Copper (0) powder | 1.0 |
| para-Toluenesulfonyl chloride | 85.4 |
| Aromatic 100 | 459.0 |
| | 0.0 |
| Charge 2 | |
| Glycidyl Methacrylate | 576.0 |
| Charge 3 | |
| Methoxy polyethylene glycol 350 Methacrylate | 2499.0 |
| Aromatic 100 | 300.0 |
| Charge 4 | |
| acetic acid | 5.0 |
| ion exchange resin (Amberlite IRC 7480) | 120.0 |
| Charge 5 | |
| 3-hydroxy-2-Napthoic acid | 535.0 |
| triethyl amine | 3.4 |

Charge 1 was mixed in a 5 Liter round-bottom flask fitted with an air motor stirrer, a thermocouple, nitrogen adapter, and a condenser. The mixture was sparged with nitrogen for 15 minutes, and heated to 80° C. Charge 2 was added over 5 minutes, and then held for 3.5 hrs. After holding, charge 3 was charged over 5 minutes, and then held for 2.5 hrs. The reaction mixture was then filtered though paper filter to remove bulk copper. Charge 4 was then added at 80° C., and allowed to stir for 3 hrs while exposed to air. The ion exchange resin was then filtered off. Charge 5 was then added, and held at 150° C. for 3 hrs. After that, solvent in the resin was removed by vacuum. The resulting material was found to be 98% solid with a number average molecular weight of 2,986 g/mol, a weight average molecular weight of 6159 g/mol and Mn/Mw of 2.1.

Example 5

Figure 3:
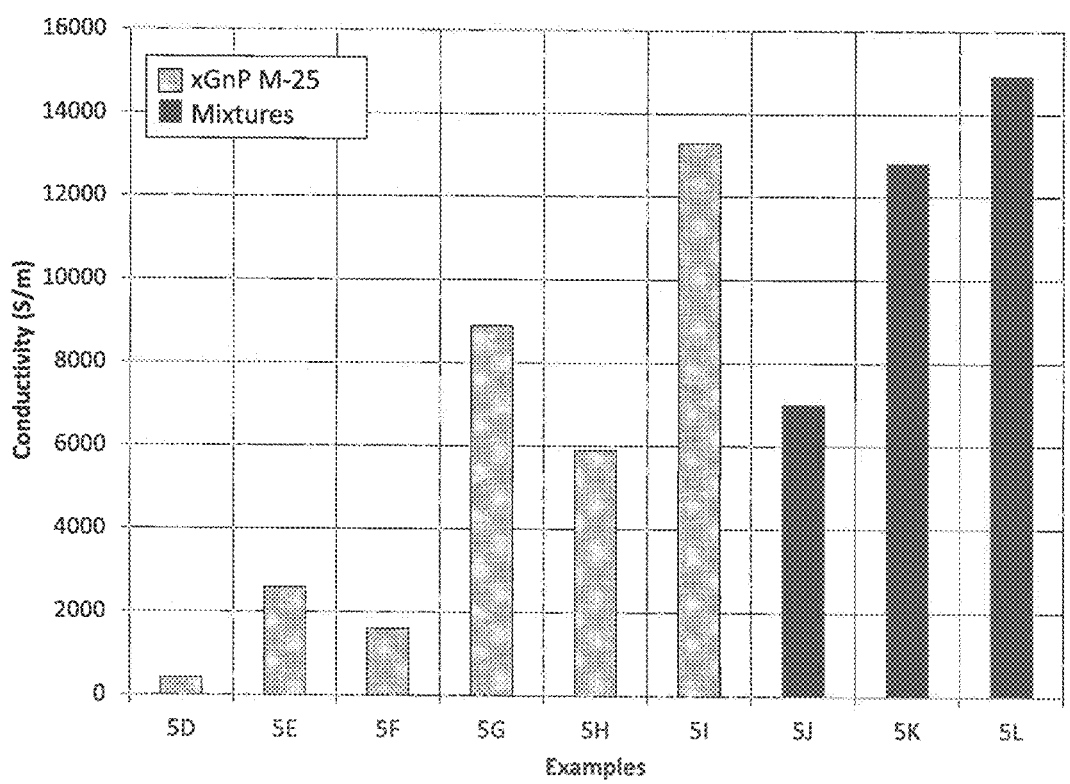
FIG. 3 is a graph illustrating electrical conductivity properties of coatings containing graphenic carbon particles in accordance with embodiments of the invention.

Each of the samples from Example 4 (4A, 4B, 4C, 4D, 4E, 4F, 4G, 4H, 4I, 4J, 4K and 4L) were applied as 1-2 mm wide lines in a serpentine circuit pattern to a 2×3 inch glass slide (Fisherbrand, Plain, Precleaned) using a dispensing jet (PICO valve, MV-100, Nordson, EFD) and a desktop robot (2504N, Janome) and then dried in an oven at 212° F. for 30 minutes to produce, respectively, Samples 5A, 5B, 5C, 5D, 5E, 5F, 5G, 5H, 5I, 5J, 5K and 5L. For each of the coated samples that provided robust-enough circuit lines, the electrical conductivity was determined by first measuring the resistance of the serpentine circuit vs. the length of the circuit line. Then, the cross-sectional area of the serpentine lines was measured using a stylus profilometer (Dektak). Using the measured values for the cross sectional area (A) and the resistance (R) for a given length (L) of the circuit, the resistivity ($\rho$) was calculated using the equation $\rho=RA/L$. The conductivity ($\sigma$) was then calculated by taking the reciprocal of the resistivity, $\sigma=1/\rho$. Conductivity results are shown in Table 5. The conductivity results listed in Table 5 are shown graphically in FIG. 3.

TABLE 5

| Sample | Conductivity (S/m) | Resin | Solvent | GCP |
|---|---|---|---|---|
| 5A | — | EC | nmp | TPG |
| 5B | — | SB | nmp | TPG |
| 5C | — | WB | DIW/DPM | TPG |
| 5D | 400 | EC | EtOH | M-25 |
| 5E | 2600 | EC | nmp | M-25 |
| 5F | 1600 | SB | nba | M-25 |
| 5G | 8900 | SB | nmp | M-25 |
| 5H | 5900 | WB | DIW | M-25 |
| 5I | 13300 | WB | DIW/DPM | M-25 |
| 5J | 7000 | EC | nmp | Mix |
| 5K | 12800 | SB | nmp | Mix |
| 5L | 14900 | WB | DIW/DPM | Mix |

In Table 5, the "—" symbol indicates samples in which the circuit lines were not robust, so the resistance could not be measured. The abbreviations in Table 5 are: EC=ethyl cellulose; nmp=n-methyl-2-pyrrolidone; GCP=graphenic carbon particles; DIW=deionized water; DIW/DPM=50/50 mixture of deionized water and Dowanol PM; EtOH=ethanol; nba=n-butyl acetate; TPG=thermally produced graphenic carbon produced in accordance with the method disclosed in U.S. Pat. No. 8,486,364 having a measured BET surface area of 280 m$^2$/g; M-25=xGnP M-25; and Mix=mixture where 92 weight % of the total graphenic carbon consisted of xGnP M-25 and 8 weight % of the total graphenic carbon was that produced in accordance with the method disclosed in U.S. Pat. No. 8,486,364 having a measured BET surface area of 280 m$^2$/g.

For purposes of this detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

It will be readily appreciated by those skilled in the art that modifications may be made to the invention without departing from the concepts disclosed in the foregoing description. Such modifications are to be considered as included within the following claims unless the claims, by their language, expressly state otherwise. Accordingly, the particular embodiments described in detail herein are illustrative only and are not limiting to the scope of the invention which is to be given the full breadth of the appended claims and any and all equivalents thereof.

We claim:

1. A dispersion comprising:
   a solvent;
   graphenic carbon particles comprising one or more layers of one-atom-thick planar sheets of sp$^2$-bonded carbon atoms dispersed in the solvent, wherein the graphenic carbon particles comprise thermally produced graphenic carbon particles and exfoliated graphite particles having different particle size distributions, and at least a portion of the graphenic carbon particles are planar and have an average aspect ratio greater than 3:1; and a polymeric dispersant comprising
   a tri-block copolymer prepared by controlled radical polymerization and represented by the following formula,

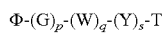

$\Phi$-(G)$_p$-(W)$_q$-(Y)$_s$-T wherein $\Phi$ is a hydrophobic residue of or derived from a monomeric initiator, and is free of a radically transferable group,
   G is a hydrophobic residue of an oxirane functional monomer reacted with a carboxylic acid,
   W is a residue of (meth)acrylic acid alkyl esters, and -(W)$_q$- defines a W-block,
   Y is a residue of (meth)acrylic acid alkyl esters, and -(Y)$_s$- defines a Y-block, wherein said W-block is different from said Y-block,
   T is or is derived from the radically transferable group of said monomeric initiator, and
   p, q, and s are each independently at least 1.

2. The dispersion of claim 1, wherein the solvent comprises an organic solvent comprising n-methyl-2-pyrrolidone, n-butyl acetate, propylene glycol monomethylether, 4-hydroxybutyric acid gamma-lactone, ethanol, 2-butoxyethanol, acetone, toluene, xylene, aromatic solvent 100, methyl ether propylene glycol acetate and/or methyl amyl ketone or a combination thereof.

3. The dispersion of claim 1, wherein the solvent comprises an organic solvent comprising n-methyl-2-pyrrolidone, n-butyl acetate, propylene glycol monomethylether or a combination thereof.

4. The dispersion of claim 1, wherein the solvent comprises water.

5. The dispersion of claim 4, wherein the solvent further comprises an organic solvent.

6. The dispersion of claim 5, wherein the organic solvent comprises propylene glycol monomethylether and/or ethanol.

7. The dispersion of claim 1, wherein the weight ratio of graphenic carbon particles to the polymeric dispersant is from 1:10 to 10:1.

8. The dispersion of claim 1, further comprising at least one film-forming resin.

9. The dispersion of claim 8, wherein the at least one film forming resin comprises epoxy resins, acrylic polymers, polyester polymers, polyurethane polymers, polyamide polymers, polyether polymers, bisphenol A based epoxy polymers, polysiloxane polymers, styrenes, ethylenes, butylenes, copolymers thereof, and combinations thereof.

10. The dispersion of claim 8, wherein a cured coating deposited from the dispersion has an electrical conductivity of at least 1 S/m.

11. The dispersion of claim 10, wherein the electrical conductivity is at least 10,000 S/m.

12. The dispersion of claim 8, wherein the weight ratio of graphenic carbon particles to film-forming resin is from 0.1:100 to 10:1.

13. The dispersion of claim 8, wherein the weight ratio of graphenic carbon particles to film-forming resin is from 1:100 to 7:1.

14. An electrically conductive coating film comprising a dried dispersion, wherein the dispersion comprises:
    a solvent;
    graphenic carbon particles comprising one or more layers of one-atom-thick planar sheets of sp$^2$-bonded carbon atoms dispersed in the solvent, wherein the graphenic carbon particles comprise thermally produced graphenic carbon particles and exfoliated graphite particles having different particle size distributions, and at least a portion of the graphenic carbon particles are planar and have an average aspect ratio greater than 3:1; and a polymeric dispersant comprising
    a tri-block copolymer prepared by controlled radical polymerization and represented by the following formula,

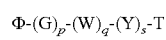

$\Phi$-(G)$_p$-(W)$_q$-(Y)$_s$-T wherein $\Phi$ is a hydrophobic residue of or derived from a monomeric initiator, and is free of a radically transferable group,
    G is a hydrophobic residue of an oxirane functional monomer reacted with a carboxylic acid,
    W is a residue of (meth)acrylic acid alkyl esters, and -(W)$_q$- defines a W-block,
    Y is a residue of (meth)acrylic acid alkyl esters, and -(Y)$_s$- defines a Y-block, wherein said W-block is different from said Y-block,
    T is or is derived from the radically transferable group of said monomeric initiator, and
    p, q, and s are each independently at least 1.

15. The electrically conductive coating film of claim 14, wherein the film comprises a cured resin.

16. A method of dispersing graphenic carbon particles in a solvent comprising mixing the graphenic carbon particles comprising one or more layers of one-atom-thick planar sheets of $sp^2$-bonded carbon atoms, wherein the graphenic carbon particles comprise thermally produced graphenic carbon particles and exfoliated graphite particles having different particle size distributions, and at least a portion of the graphenic carbon particles are planar and have an average aspect ratio greater than 3:1, in the solvent in the presence of a polymeric dispersant comprising a tri-block copolymer prepared by controlled radical polymerization and represented by the following formula, $$\Phi\text{-}(G)_p\text{-}(W)_q\text{-}(Y)_s\text{-}T$$

wherein Φ is a hydrophobic residue of or derived from a monomeric initiator, and is free of a radically transferable group, G is a hydrophobic residue of an oxirane functional monomer reacted with a carboxylic acid, W is a residue of (meth)acrylic acid alkyl esters, and $\text{-}(W)_q\text{-}$ defines a W-block, Y is a residue of (meth)acrylic acid alkyl esters, and $\text{-}(Y)_s\text{-}$ defines a Y-block, wherein said W-block is different from said Y-block, T is or is derived from the radically transferable group of said monomeric initiator, and p, q, and s are each independently at least 1.

17. The dispersion of claim 1, wherein the thermally produced graphenic carbon particles comprise from 1 to 50 weight percent and the exfoliated graphite particles comprise from 50 to 99 weight percent based on the total combined weight of the thermally produced graphenic carbon particles and the exfoliated graphite particles.

\* \* \* \* \*